United States Patent
Mukojima

(10) Patent No.: US 6,956,160 B2
(45) Date of Patent: Oct. 18, 2005

(54) TONE GENERATOR APPARATUS SHARING PARAMETERS AMONG CHANNELS

(75) Inventor: Masahiro Mukojima, Fukuroi (JP)

(73) Assignee: Yamaha Corporation, Hamamatsu (JP)

( * ) Notice: Subject to any disclaimer, the term of this patent is extended or adjusted under 35 U.S.C. 154(b) by 122 days.

(21) Appl. No.: 10/172,660

(22) Filed: Jun. 14, 2002

(65) Prior Publication Data

US 2002/0189430 A1 Dec. 19, 2002

(30) Foreign Application Priority Data

Jun. 15, 2001 (JP) ........................................ 2001-181476

(51) Int. Cl.⁷ ................................................ G10H 7/02
(52) U.S. Cl. .............................. 84/602; 84/647; 84/645
(58) Field of Search .......................... 84/600–609, 645, 84/615, 630, 633, 665, 662, 647–652

(56) References Cited

U.S. PATENT DOCUMENTS

| 5,254,805 | A | * | 10/1993 | Iizuka | 84/626 |
| 5,677,504 | A | * | 10/1997 | Kurata | 84/617 |
| 5,831,193 | A | * | 11/1998 | Suzuki et al. | 84/603 |
| 5,880,386 | A | * | 3/1999 | Wachi et al. | 84/601 |
| 5,949,011 | A | * | 9/1999 | Ichiki | 84/602 |
| 6,184,455 | B1 | | 2/2001 | Tamura | 84/266 |

FOREIGN PATENT DOCUMENTS

| EP | 0 674 483 A1 | 10/1995 |
| JP | 05-341784 | 12/1993 |
| JP | 11-282463 | 10/1999 |
| JP | 2001-75566 | 3/2001 |
| JP | 2001-109472 | 4/2001 |
| WO | WO01/11603 | 2/2001 |
| WO | WO 01/15410 A2 | 3/2001 |

OTHER PUBLICATIONS

Korean Office Action dated Aug. 30, 2004.
Japanese Patent Office, Office Action, issued Nov. 9, 2004.
Notice of Rejection by Japan Patent Office for Japanese Patent Application No. 2001–181476 dated Mar. 25, 2005.
European Patent Office European Search Report Dated Jun. 2, 2005.

* cited by examiner

*Primary Examiner*—Marlon T. Fletcher
*Assistant Examiner*—David S. Warren
(74) *Attorney, Agent, or Firm*—Pillsbury Winthrop Shaw Pittman LLP

(57) ABSTRACT

A music apparatus utilizes a tone generator including a plurality of tone generating elements to generate a plurality of music tones arranged in a set of performance parts of a music piece based on sequence data. An assigning section assigns the plurality of tone generating elements to the set of the performance parts. A sequencer processes the sequence data to sequentially provide parameters for use in the tone generating elements. A register is divided into a first area for storing first parameters to be applied individually by each of two or more tone generating elements and a second area for storing a second parameter to be applied commonly by two or more tone generating elements. Each tone generating element uses both of the stored first parameter and second parameter corresponding to the tone generating element.

12 Claims, 11 Drawing Sheets

FIG.4

| EVENT TYPE | | Prt(0–15) | DATA | DATA |
|---|---|---|---|---|
| KEY-ON EVENT | keyOn | #Prt | KCD | Velocity |
| KEY-OFF EVENT | keyOff | #Prt | KCD | |
| PART VOLUME CHANGE EVENT | PrtVol | #Prt | Data | |
| PAN-POT CHANGE EVENT | Panpot | #Prt | Data | |
| VIBRATO CHANGE EVENT | XVB | #Prt | Data | |
| PITCH BEND CHANGE EVENT | BEND | #Prt | Data | |
| PROGRAM CHANGE EVENT | PC | #Prt | DATA (TIMBRE NUMBER) | |

FIG.6

| | D6 | D5 | D4 | D3 | D2 | D1 | D0 | |
|---|---|---|---|---|---|---|---|---|
| #0 | Voice Adr [14:8] | | | | | | | |
| #1 | Voice Adr [7:1] | | | | | | | |
| #2 | VoVol | | | | | 0 | 0 | |
| #3 | | FNUM (H) | | | BLOCK | | | |
| #4 | FNUM (L) | | | | | | | |
| #5 | KeyOn | Mute | RST | #PRT | | | | |

FM Voice #0

| #90 | Voice Adr [14:8] |
| #91 | Voice Adr [7:1] |
| #92 | VoVol ... 0 0 |
| #93 | FNUM (H) ... BLOCK |
| #94 | FNUM (L) |
| #95 | KeyOn Mute RST #PRT |

FM Voice #15

34a

| #96 | Voice Adr [14:8] |
| #97 | Voice Adr [7:1] |
| #98 | VoVol ... 0 0 |
| #99 | 0 FNUM (H) BLOCK |
| #100 | FNUM (L) |
| #101 | KeyOn Mute RST #PRT |

WT Voice #0

| #138 | Voice Adr [14:8] |
| #139 | Voice Adr [7:1] |
| #140 | VoVol ... 0 0 |
| #141 | 0 FNUM (H) BLOCK |
| #142 | FNUM (L) |
| #143 | KeyOn Mute RST #PRT |

WT Voice #7

| #144 | PrtVol VALUE FOR #0 ... 0 0 |
| #159 | PrtVol VALUE FOR #15 ... 0 0 |

PrtVol

| #160 | PANPOT VALUE FOR #0 ... 0 0 |
| #175 | PANPOT VALUE FOR #15 ... 0 0 |

Panpot

34b

| #176 | 0 ... 0 XVB#0 |
| #191 | 0 ... 0 XVB#15 |

XVB

| #192 | 0 0 INT#0 FRAC (H) #0 |
| #193 | FRAC (L) #0 ... 0 |
| #222 | 0 0 INT#15 FRAC (H) #15 |
| #223 | FRAC (L) #15 ... 0 |

BEND

FIG.8 (a)

| Prt | TIMBRE NUMBER (0-127) | Voice adr |
|---|---|---|
| 0 | | |
| 1 | | |
| ⋮ | | |
| 15 | | |

FIG.8 (b)

| Voice # | KeyOn (1 or 0) | KCD | Prt (0-15) | | |
|---|---|---|---|---|---|
| FM0 | | | | | |
| 1 | | | | | |
| ⋮ | | | | | |
| 15 | | | | | |
| WT0 | | | | | |
| 1 | | | | | |
| ⋮ | | | | | |
| 7 | | | | | |

TONE GENERATOR APPARATUS SHARING PARAMETERS AMONG CHANNELS

BACKGROUND OF THE INVENTION

1. Technical Field of the Invention

The present invention relates to a tone generator apparatus capable of polyphonic tone generation and a musical sound apparatus having the tone generator apparatus.

2. Prior Art

FIG. 11 shows a configuration example of a conventional hardware musical sound apparatus. In FIG. 11, a CPU (Central Processing Unit) 110 supplies tone generator hardware 115 with music content data 111 comprising song sequence data such as SMF (Standard MIDI File) data, SMAF (Synthetic Music Mobile Application Format) data, etc. The tone generator hardware 115 is provided with a tone generator section 133 and a sequencer 132. The tone generator section 133 contains a plurality of tone generating elements and is capable of generating a plurality of musical tones defining a plurality of voices (also referred to as sound channels). The sequencer 132 interprets the song sequence data and supplies specific control data to the tone generator section at a specified timing. The sequencer 132 includes a hardware-specific control data conversion section 132a and a time management section 132b. The hardware-specific control data conversion section 132a converts SMF data and SMAF data to control data specific to the tone generator section 133. The control data may include tone generation control parameters supplied to the above-mentioned plurality of tone generating elements. The time management section 132b controls generation of musical tones according to time management information in the control data.

When the hardware musical sound apparatus having the above-mentioned configuration reproduces a musical tone, the time management section 132b issues a data output instruction to the hardware-specific control data conversion section 132a. The instruction is used for interval data indicative of a time interval between note events included in song sequence data and the timing based on gate time data indicative of a tone generation period. In response to the instruction, the hardware-specific control data conversion section 132a outputs the converted hardware-specific control data to the tone generator section 133. Based on the supplied hardware-specific control data, the above-mentioned tone generating elements generate musical tones of the respective voices through the respective channels for output in the tone generator section 133. This operation reproduces the musical tone based on the song sequence data.

FIG. 12 shows another configuration example of the conventional musical sound apparatus. The musical sound apparatus in FIG. 12 substitutes the CPU's software processing for the sequencer 132 of the tone generator hardware 115 in the above-mentioned hardware musical sound apparatus.

Likewise the tone generator section 133 of FIG. 11, a tone generator hardware 215 in FIG. 12 includes a tone generator section 233 having a plurality of tone generating elements. A CPU 210 executes a sequencer program to implement a sequencer function means 232 comprising a hardware-specific control data conversion means 210a and a time management means 210b. The hardware-specific control data conversion means 210a converts song sequence data 211 such as SMF data and SMAF data to control data specific to the tone generator hardware 215. The time management means 210b controls timing of musical tone generation according to time management information in the data. Song sequence data comprises a series of note event information and time information indicating a time interval between events. The hardware-specific control data conversion means 210a references such information specific to the tone generator section 233 as parameters for the tone generating elements in the tone generator section 233. Based on the event information in the song sequence data 211, the hardware-specific control data conversion means 210a generates hardware-specific control data proper to the tone generator section 233. The hardware-specific control data conversion means 210a outputs the hardware-specific control data to the tone generator section 233 based on the timing determined by the time information under control of the time management means 210b. The tone generator section 233 writes the hardware-specific control data sent from the CPU 210 to a tone generator control register which stores parameters corresponding to each tone generating element. Based on the storage content in the tone generator control register, each tone generating element generates a musical tone for each voice.

Generally, when a tone generator has a plurality of voices and is capable of simultaneously generating a plurality of timbres, such tone generator uses the DVA (dynamic voice allocation) system, which dynamically allocates a free channel of an unused tone generating element to a performance part of a music piece. Namely, no fixed criterion is provided as to which tone generating element generates a musical tone of which performance part. The hardware-specific control data conversion means 210a uses a timbre table and a voice assign table to convert the event information to the corresponding hardware-specific control data. The timbre table stores the correspondence between a channel and a timbre. The voice assign table stores the usage of tone generating elements (namely, channels) in the tone generator section 233. Corresponding to the event information, the hardware-specific control data conversion means 210a references these tables to create hardware-specific control data for controlling the tone generator section 233. The hardware-specific control data conversion means 210a sends the hardware-specific control data to the tone generator section 233 at the timing specified by the time management means 210b. Here, the hardware-specific control data signifies a tone generation control parameter corresponding to each tone generating element. Each tone generating element in the tone generator section is directly controlled by the hardware-specific control data to generate a musical tone of the corresponding voice.

Concerning the hardware musical sound apparatus as shown in FIG. 11, the CPU 110 simply sends the song sequence data 111 to the tone generator hardware 115 during reproduction of a song or music piece, thereby decreasing processing loads. Since the sequencer 132 is responsible for the music content data conversion and the time management, however, the sequencer 132 is complicatedly configured. The sequencer 132 needs a large-scale circuitry, thereby increasing costs. When a new format is developed for music content data, securing the compatibility to that format is difficult.

The musical sound apparatus in FIG. 12 uses software to provide the sequencer capability. Since the CPU 210 is responsible for the music content data conversion and the time management, however, the CPU 210 increases processing loads for reproducing a song. Let us assume that an event occurs in a performance part to change the volume of a musical tone for a given channel. Control data is created and is sent to all tone generating elements, which generate the musical tone for that performance part of the song. The CPU needs to create and send many pieces of control data for the tone generator. Accordingly, the CPU needs to operate as fast as possible. When the CPU mainly performs other highly important processes such as communication control, an expensive and high-speed CPU has been required.

SUMMARY OF THE INVENTION

It is therefore an object of the present invention to provide a tone generator apparatus and a musical sound apparatus which can comply with music content data having a new format, only require a small software load for controlling the tone generator hardware and a small amount of data to be controlled, and prevent the amount of hardware from increasing.

In order to achieve the above-mentioned objects, a tone generator apparatus according to the present invention comprises a plurality of tone generating elements that define a plurality of channels for generating a plurality of tones in parallel manner, and a register that is divided into a first area and a second area for storing individual parameters provided individually for each of the channels in the first area, and storing common parameters provided commonly for two or more of the channels in the second area, wherein said tone generating element is constructed to use both of the individual parameter and the common parameter corresponding to the channel defined by said tone generating element for generating the tone specific to the channel and characterized by both of the individual parameter and the common parameter.

Further, the plurality of the channels are assigned to a set of parts such that each part may involve two or more channels for concurrently generating two or more tones, the register stores the individual parameter including identification information identifying the part to which the channel corresponding to the individual parameter is assigned, and stores the respective common parameters in correspondence to the respective parts, and the tone generating element acquires the individual parameter from first area of the register, and acquires from the second area of the register the common parameter corresponding to the part which is identified by the identification information contained in the acquired individual parameter.

A musical sound apparatus according to the present invention is constructed for generating music tones from a plurality of channels based on music sequence data. The music sound apparatus comprises a sequencer that processes the music sequence data to sequentially provide parameters including individual parameters provided individually for each of the channels and common parameters provided commonly for two or more of the channels, a plurality of tone generating elements that define the plurality of the channels for generating therethrough the music tones in parallel manner, and a register that is divided into a first area for storing the individual parameters provided from the sequencer and a second area for storing the common parameters provided from the sequencer, wherein said tone generating element is constructed to use both of the individual parameter and the common parameter corresponding to the channel defined by said tone generating element for generating the music tone specific to the channel and characterized by both of the individual parameter and the common parameter.

There is provided a parameter storage section (tone generator control register) for the tone generator apparatus and the musical sound apparatus according to the present invention. The tone generator control register stores tone generation parameters for the tone generating elements by separating the parameters into those specific to each tone generating element and those shared among the tone generating elements. The tone generating elements are configured to generate a musical tone in accordance with the parameters specific to each tone generating element and the parameters shared among the tone generating elements. A sequencer can simply supply the parameters shared among the tone generating elements to the tone generator apparatus without supplying them as control parameters for respective tone generating elements. Accordingly, the sequencer can simplify conversion from song sequence data to control data including the parameters supplied to the tone generator apparatus. In addition, the sequencer can decrease the amount of control parameters supplied to the tone generator apparatus. This can decrease processing loads on the sequencer. Further, it is possible to easily provide compatibility with a new format and suppress an increase in the amount of hardware for the tone generator apparatus.

BRIEF DESCRIPTION OF THE DRAWINGS

FIG. 4 illustrates event information;

FIG. 6 shows a configuration example of a tone generator control register;

FIGS. 8(a) and 8(b) illustrate a timbre table and a voice assign table;

DETAILED DESCRIPTION OF THE EMBODIMENTS

It is possible to apply a musical sound apparatus using the tone generator and a tone generator apparatus according to the present invention to various devices. The following describes an embodiment for applying the musical sound apparatus according to the present invention to a portable terminal set (e.g., a portable telephone set).

Figure 1:
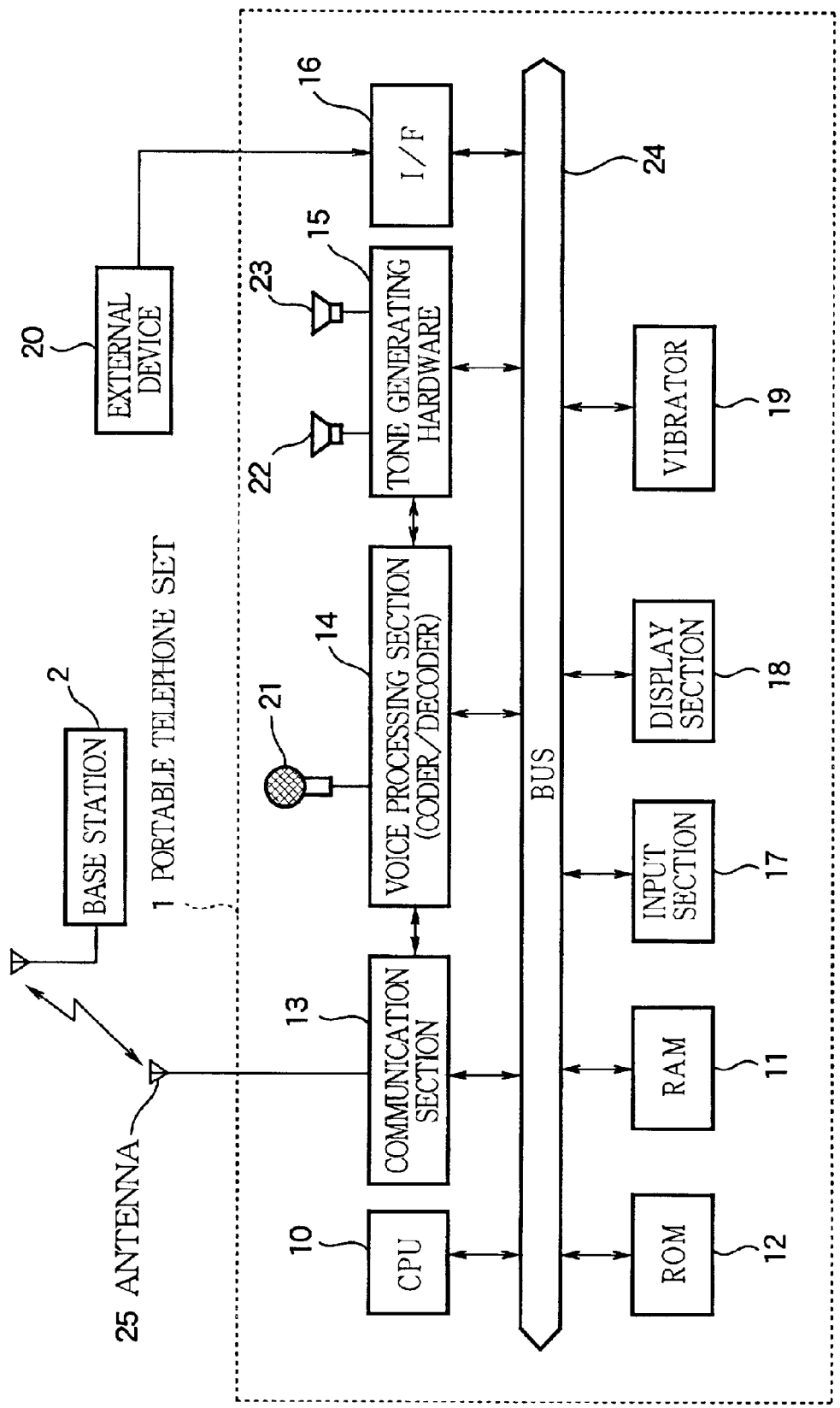
FIG. 1 shows a configuration example of an embodiment when the musical sound apparatus according to the present invention is applied to a portable telephone set.

FIG. 1 shows a configuration example of a portable telephone set mounted with the musical sound apparatus according to the present invention. In this figure, a portable telephone set 1 has an antenna 25 (generally retractable) and is connectable with a base station 2 via a radio line. The antenna 25 is connected to a communication section 13 having a modulation/demodulation capability. A central processing unit (CPU) 10 works as a system control section for controlling operations of the portable telephone set by executing a telephone function program. The CPU 10 has a timer to indicate the elapsed time during operation or to generate a timer interrupt at a given interval. Further, the CPU 10 performs processing related to musical tone generation such as music data conversion to be described later. RAM (Random Access Memory) 11 is used for storing music content data downloaded from a download center etc. connected via the base station 2 or storing tone generator hardware control data converted from the music content data. The RAM 11 is also used as a work area for the CPU 10. ROM (Read Only Memory) 12 stores various programs such as various telephone function programs for call origination and termination, programs related to musical tone generation, etc. performed by the CPU 10 and various data such as preset tone generator hardware control data etc.

The communication section 13 demodulates a signal received at the antenna 25, modulates another signal to be transmitted, and supplies the signal to the antenna 25. A voice processing section (coder/decoder) 14 decodes the received signal demodulated in the communication section 13 and compresses a speech signal input from a microphone 21. The voice processing section 14 compresses or decompresses a voice signal highly effectively and uses a coder/decoder according to CELP (Code Excited LPC) or the ADPCM (Adaptive Differential Pulse Code Modulation) system. Tone generator hardware 15 uses a receiver speaker 22 to sound a received signal from the voice processing section 14. The tone generator hardware 15 can generate musical tones for a call signal with melodies and a holding tone by reproducing the converted tone generator hardware control data. A call termination speaker 23 sounds the call signal with melodies. The receiver speaker 22 sounds the holding tone mixed with the received signal.

An interface (I/F) 16 is used for reading music content data from an external device 20 such as a personal computer, etc. An input section 17 is an input means comprising numeric push buttons "0" through "9" on the portable telephone set 1 and various buttons. A display section 18 displays a menu for the telephone function and information corresponding to button operations of numeric push buttons, etc. A vibrator 19 notifies a user of an incoming call by vibrating the body of the portable telephone set 1 instead of sounding a ringing tone. The respective function blocks interchange data with each other via a bus 24.

Figure 2:
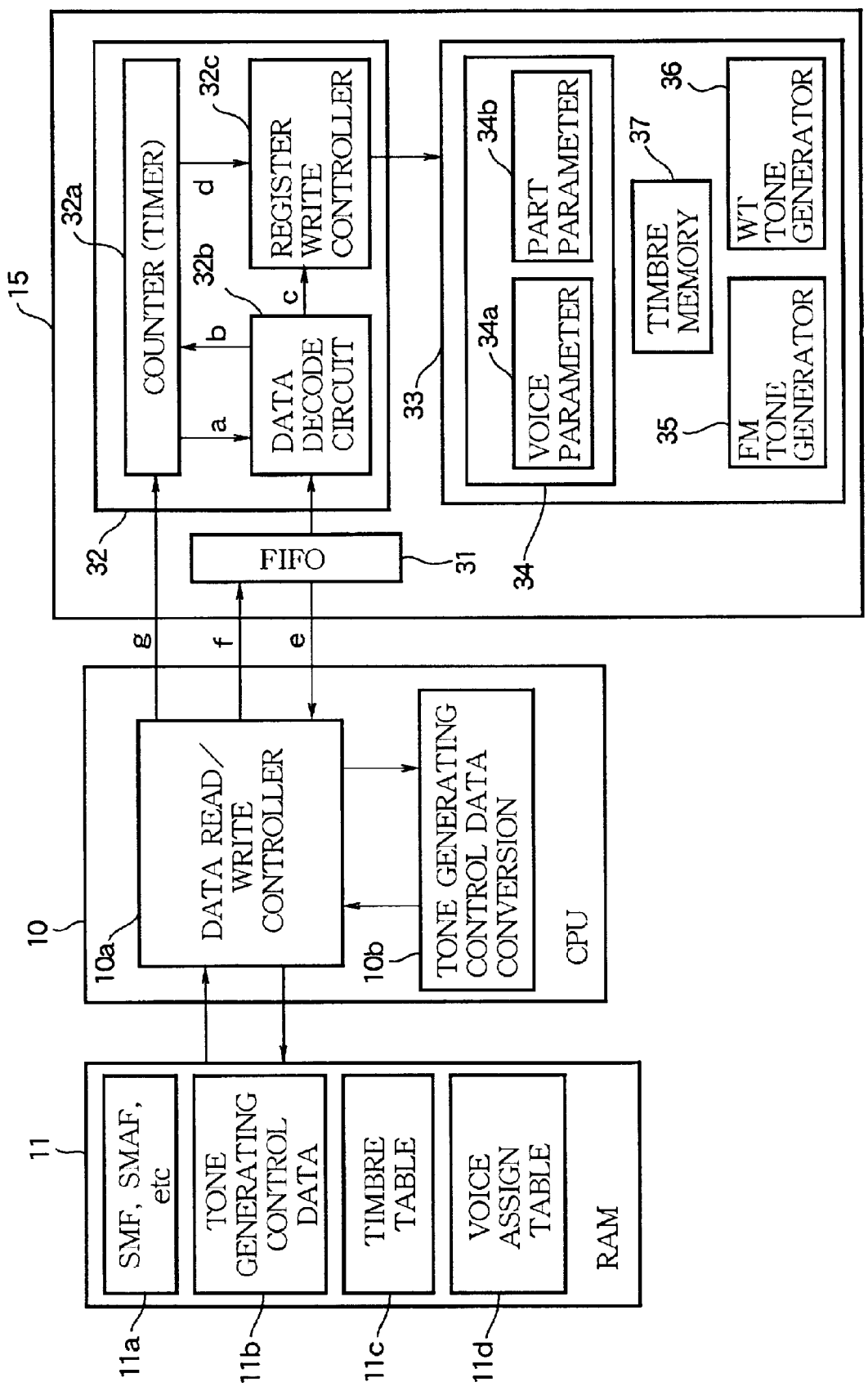
FIG. 2 shows a configuration example of the musical sound apparatus according to the embodiment of the present invention.

FIG. 2 is a function block diagram of the musical sound apparatus according to the present invention applied to the above-mentioned portable telephone set.

As shown in FIG. 2, the musical sound apparatus according to the present invention is provided with a data read/write controller 10a and a tone generator hardware control data conversion means 10b in the CPU 10. These means are implemented by software. The tone generator hardware 15 contains a sequencer 32 and a tone generator block 33. Namely, the musical sound apparatus according to the present invention provides the hardware-specific control data conversion, which is a part of the sequencer function, by using the tone generator hardware control data conversion means 10b implemented by the software processing of CPU 10. The sequencer 32 in the tone generator hardware 15 is responsible for the time management of the sequencer function.

The tone generator hardware 15 contains the tone generator block 33. The tone generator block 33 includes a tone generator control register 34 which stores control parameters for the tone generating elements. The tone generator control register 34 has two areas: a voice parameter area 34a and a part parameter area 34b. The voice parameter area 34a stores a control parameter corresponding to each tone generating element. The part parameter area 34b stores a control parameter for controlling musical tones corresponding to each part. Each tone generating element in the tone generator apparatus according to the present invention generates a voice in accordance with both the first control parameter stored in the voice parameter area 34a and the second control parameter stored in the part parameter area 34b.

The following describes in detail the configuration and operations of the musical sound apparatus shown in FIG. 2. The figure omits the receiver speaker 22, the call termination speaker 23, and associated configurations. Data is interchanged among the CPU 10, the tone generator hardware 15, and the RAM 11 via the bus 24 in the figure.

In FIG. 2, the RAM 11 contains a song file storage area 11a and a tone generator hardware control data storage area 11b. The song file storage area 11a stores song sequence data such as SMF data and SMAF data. The tone generator hardware control data storage area 11b stores tone generator hardware control data converted from the song sequence data by the tone generator hardware control data conversion means 10b of the CPU 10. For reproducing a song, the RAM 11 stores a timbre table 11c and a voice assign table 11d. The timbre table 11c stores the correspondence between a performance part (a MIDI channel for SMF or a part for SMAF) and a timbre. The voice assign table 11d manages the usage of the tone generating elements in the tone generator block 33.

The CPU 10 reads music content data from the song file storage area 11a of the RAM 11 when the processing has a time allowance, or an instruction is issued to reproduce the music content data. The CPU 10 converts the music content data to tone generator hardware control data. The CPU 10 then stores the converted tone generator hardware control data in the tone generator hardware control data storage area 11b of the RAM 11. The music content data is converted to the tone generator hardware control data as follows. The data read/write controller 10a sequentially reads music content data to be converted from the beginning of the song file storage area 11a in the RAM 11. The data read/write controller 10a then supplies the read data to the tone generator hardware control data conversion means 10b. The tone generator hardware control data conversion means 10b interprets the supplied music content data and sequentially converts it to tone generator hardware control data. The data read/write controller 10a sequentially writes the converted tone generator hardware control data to the tone generator hardware control data storage area 11b in the RAM 11. In this manner, the CPU 10 can convert music content data to tone generator hardware control data. A musical tone can be reproduced while the CPU 10 performs the data conversion. In such a case, the data read/write controller 10a writes converted tone generator hardware control data f to FIFO (First-In First-Out) buffer 31 in the tone generator hardware 1.

Figure 3:
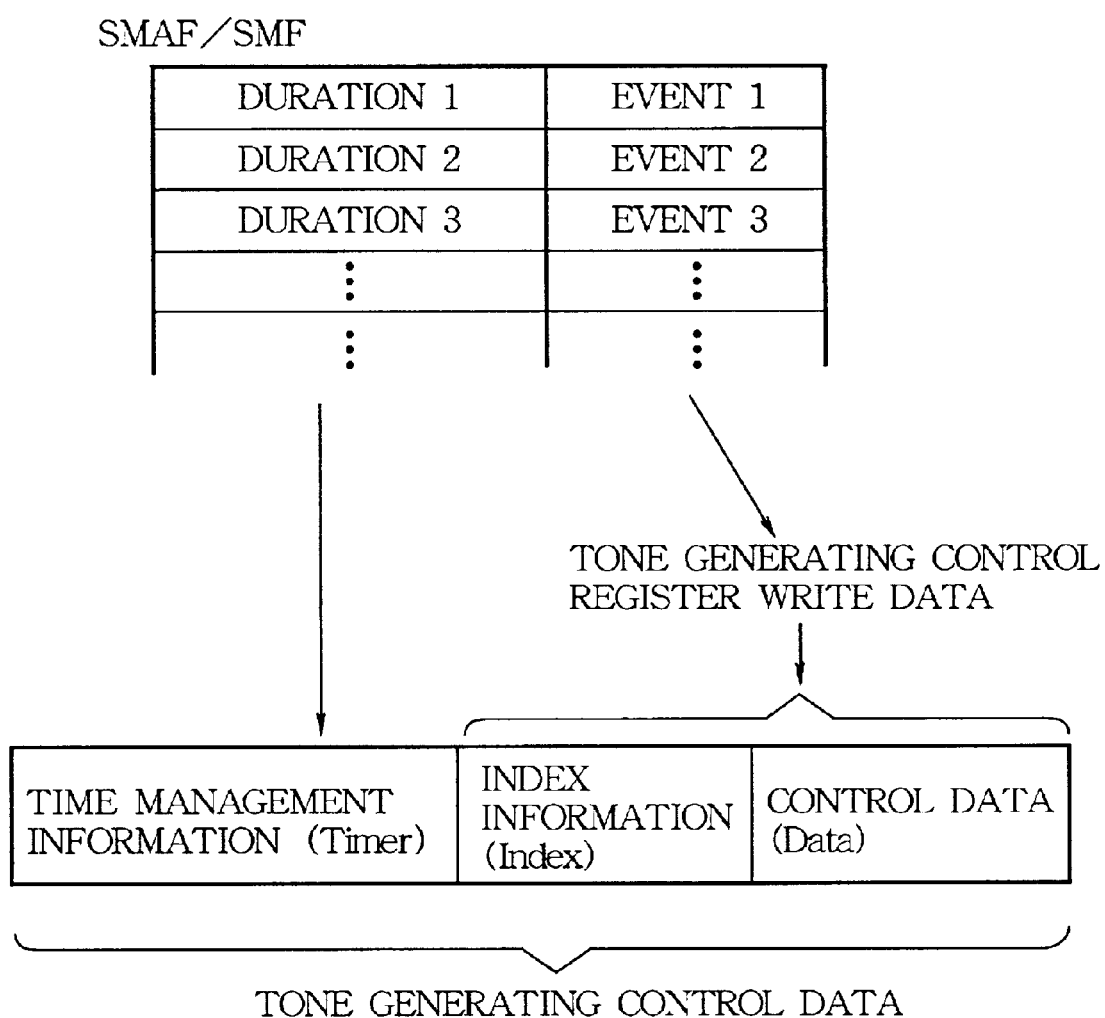
FIG. 3 is diagrams of tone generator hardware control data.

Referring now to FIG. 3, the following describes the data conversion by the tone generator hardware control data conversion means 10b. The SMF data or the SMAF data comprises a set of duration data and event data in the order of a music sequence. The duration data indicates a time interval between events. FIG. 3 shows sets of duration 1 and event 1, duration 2 and event 2, duration 3 and event 3, and so on. Duration 1 indicates a time interval between a previous event and event 1. Since event 1 is the first event, duration 1 is set to value 0. Duration 2 indicates a time interval between event 1 and event 2, duration 3 indicates a time interval between event 2 and event 3, and so on. There are arranged sets of duration information and event information in the order of occurrences wherein the duration information indicates a time interval between events.

Based on the duration information (duration 1, duration 2, and so on), the tone generator hardware control data conversion means 10*b* generates time management information (Timer) for each duration information. The tone generator hardware control data conversion means 10*b* also generates tone generator control register write data corresponding to each event from the event information (event 1, event 2, and so on). The tone generator control register write data comprises index information (Index) and control data (Data). The index information indicates an address of the tone generator control register, which should store control data corresponding to the event information. These pieces of data are combined to create a single piece of packet data. Namely, the tone generator hardware control data, i.e., a single piece of packet data, is created from a set of duration information and event information.

As mentioned above, the tone generator control register 34 in the tone generator block 33 is divided into the voice parameter area 34*a* and the part parameter area 34*b*. The voice parameter area 34*a* stores tone generation control parameters defined for each tone generating element. The part parameter area 34*b* stores parameters defined for each performance part of the music piece. The index information indicates an address of the tone generator control register 34 where control data should be written. The index information is used to write control parameters for each tone generating element to a control parameter storage area in the voice parameter area 34*a* corresponding to the tone generating element. A tone generation control parameter for the part is written to a storage area in the part parameter area 34*b* corresponding to that part. As will be described later in detail, a control parameter is written to the part parameter area 34*b* when a plurality of tone generating elements generate a plurality of musical tones for one performance part. In this manner, the control parameter can be supplied to all tone generating elements belonging to that part.

FIG. 4 shows an example of various types of event information contained in the song sequence data such as SMF data and SMAF data. The event information includes various control change events such as a key-on/off event instructing to start or stop generating a musical tone, a program change event for changing a timbre of each performance part of a music piece, a part volume change event for controlling musical tones of each part, a pan-pot change event, a vibrato change event, a pitch bend change event, etc.

As shown in FIG. 4, a key-on event comprises a block indicating an event type (key-on event), a block indicating a part number (#PRT) of the event, a data block storing a key code (KCD) indicative of the pitch, and a data block storing a velocity (Velocity) indicative of the intensity. A key-off event comprises a block indicative of the event type (key-off), a block indicative of a part number (#PRT), and a data block storing a key code.

Control change events include a part volume change event, a pan-pot change event, a vibrato change event, a pitch bend change event, etc. As shown in FIG. 4, each event comprises information indicating the event type, information indicating the part (#PRT), and data indicating the value (change amount).

A program change event changes timbres. This event comprises information indicating the event type, information indicating the part, and data containing a timbre number indicating the target timbre. The program change event is used to rewrite the timbre table.

Figure 12:
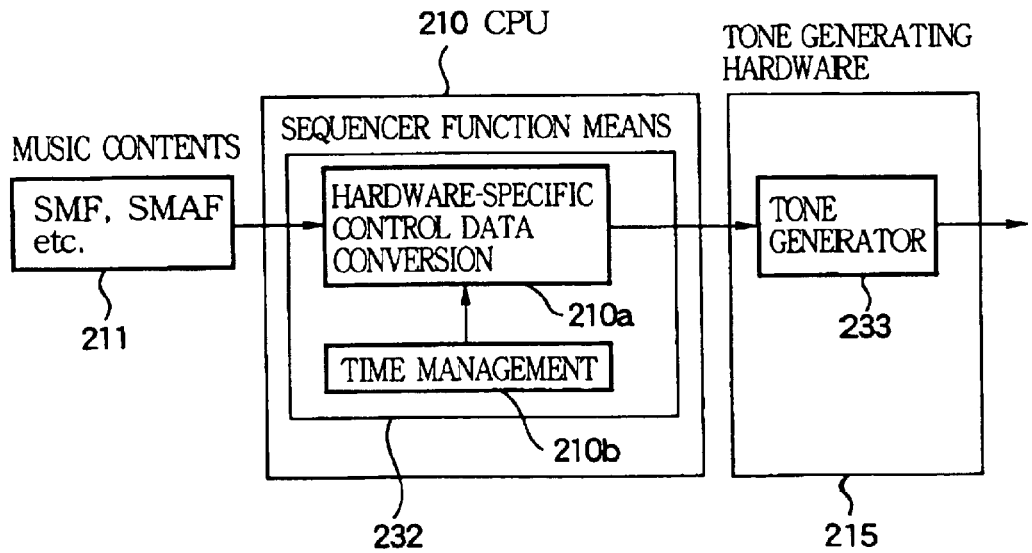
FIG. 12 shows a configuration of a conventional musical sound apparatus having a software sequencer capability.

When a control change event for controlling each part's musical tone is converted to hardware-specific control data, the hardware-specific control data conversion means 210*a* according to the prior art in FIG. 12 specifies one or more tone generating elements which generate musical tones for the part specified by that event. Hardware-specific control data is created for each of the tone generating elements. By contrast, the present invention separately provides the voice parameter area 34*a* and the part parameter area 34*b* in the tone generator control register 34. A control parameter is created corresponding to the control change event (part volume change event, pan-pot change event, vibrato change event, pitch bend change event, etc.) for controlling each part's musical tone. The created control parameter just needs to be transmitted to the part parameter area 34*b*. Accordingly, the present invention can simplify a process for converting the tone generator hardware control data and decrease the amount of control data transmitted to the tone generator hardware 15.

During reproduction of the musical tone, the data read/write controller 10*a* supplies the converted tone generator hardware control data (i.e., packet data) to the tone generator hardware 15.

As shown in FIG. 2, the tone generator hardware 15 has a FIFO buffer 31 for storing tone generator hardware control data supplied from the CPU 10. The sequencer 32 sequentially reads tone generator hardware control data from the FIFO buffer 31. The FIFO buffer 31 is a storage means for storing a specified amount of tone generator hardware control data on a first-in first-out basis. The first stored tone generator hardware control data is read first. When the tone generator hardware control data is read from the FIFO buffer 31, a given free area is provided in the FIFO buffer 31. In such a case, the FIFO buffer 31 sends FIFO data request signal e to the data read/write controller 10*a* of the CPU 10. This signal requests to transfer the succeeding tone generator hardware control data f to the FIFO buffer 31. Consequently, it is possible to reproduce a song comprising a large amount of tone generator hardware control data by using the FIFO buffer 31 having the small capacity.

The sequencer 32 in the tone generator hardware 15 has a data decode circuit 32*b*. The data decode circuit 32*b* divides a tone generator hardware control data packet read from the FIFO buffer 31 into time management information and tone generator control register write data. Tone generator control register write data c comprises index information (Index) and control data (Data). The control data (Data) is a musical tone reproduction parameter. The parameter is written to the tone generator control register 34 of the tone generator block 33 at an address specified by the index information (Index) under control of a register write controller 32*c*. The register write controller 32*c* writes the control data (Data) to the tone generator control register 34 at a timing when a register write enable signal d is output. Register write enable signal d is output at the timing when a match occurs between a duration value or a gate time value in the time management information and the value in a counter (timer) 32*a*.

The counter 32*a* in the sequencer 32 counts clocks that are output every reference time (e.g., 1 ms). The counter operation starts when the counter is supplied with a sequencer start signal g from the CPU 10. At this time, the sequencer 32 starts the sequencer processing. The counter 32a starts counting of the clocks and supplies a data decode start signal a to the data decode circuit 32b. In response to this signal, the data decode circuit 32b reads a tone generator hardware control data packet from the FIFO buffer 31, and extracts the time management information (Timer). The extracted time management information b is sent to the counter 32a. When the counter value of the counter 32a reaches the time management information b or more, the counter 32a supplies the register write enable signal d to the register write controller 32c. The counter 32a writes control data (Data) separated in the data decode circuit 32b to the tone generator control register 34 at the address specified by the index information (Index). Consequently, the tone generator block 33 generates and outputs the musical tone based on the control data (Data). When the index information (Index) indicates an address in the part parameter area 34b, that index information (Index) is supplied to all tone generating elements belonging to the corresponding part.

The data decode circuit 32b reads the next tone generator hardware control data packet from the FIFO buffer 31.

The data decode circuit 32b then separates the next time management information from the next tone generator hardware control data packet read from the FIFO buffer 31 and repeats the above-mentioned processing. Namely, when the value of the counter 32a reaches the next time management information b or more, the counter 32a supplies the register write enable signal to the register write controller 32c. The counter writes control data (Data) of the next tone generator control register write data separated in the data decode circuit 32b to the tone generator control register 34 at an address specified by the index information (Index). Consequently, the tone generator block 33 generates and outputs the musical tone based on the next tone generator control register write data. The data decode circuit 32b then reads the next tone generator hardware control data from the FIFO buffer 31. In this manner, the tone generator block 33 reproduces musical tones by sequentially reading the tone generator hardware control data from the FIFO buffer 31.

As shown in FIG. 2, the tone generator block 33 according to the embodiment of the present invention is provided with the tone generator control register 34, an FM tone generator section 35, a waveform memory tone generator section (WT tone generator section) 36, a timbre memory 37, etc. The example shows that there are provided both the FM tone generator section 35 and the WT tone generator section 36. However, only either section may be provided. The number of simultaneously available voices (number of polyphonic voices) is not limited to an example described below.

Figure 5:
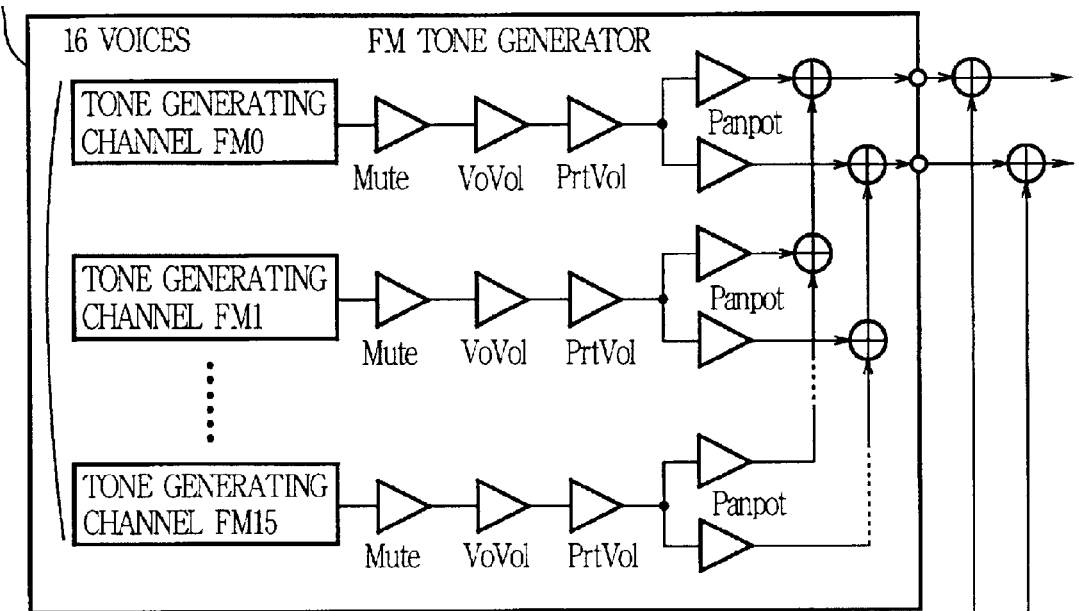
FIG. 5 shows an internal configuration of an FM tone generator section and a WT tone generator section.

FIG. 5 shows a main configuration of the FM tone generator section 35 and the WT tone generator section 36 provided in the tone generator block 33. The FM tone generator section 35 in the figure is a polyphonic FM tone generator capable of simultaneously generating 16 voices. As shown in FIG. 5, the FM tone generator section 35 has as many tone generating elements or channels as voices to be generated simultaneously. The WT tone generator section 36 is a PCM or ADPCM waveform table tone generator capable of simultaneously generating eight voices and has eight tone generating channels. Each tone generating channel in the FM tone generator section 35 and the WT tone generator section 36 generates a musical tone. An amplifier multiplies the generated musical tone by coefficients corresponding to parameters for the mute, voice volume, and part volume. The musical tone is separated into right and left stereo channels. The separated musical tones are multiplied by coefficients corresponding to pan pot parameters, and then are synthesized for output. The right and left stereo channel outputs from the tone generator sections 35 and 36 are converted to an analog signal in a D/A converter section (not shown), and are output from a speaker (not shown).

FIG. 6 shows a configuration example of the tone generator control register 34. In this example, the voice parameter area 34a corresponds to 144 words (one word comprising seven bits D0 through D6) from addresses #0 to #143 of the tone generator control register 34. The part parameter area 34b corresponds to 80 words from addresses #144 to #223 thereof. The voice parameter area 34a uses 6-word data for each of 16 FM voices #0 through #15 and eight WT voices #0 through #7. The first and second words in each voice stores parameters indicative of a timbre allocated to that voice, i.e., addresses in the timbre memory 37 for timbre data corresponding to that timbre. The third word stores a 5-bit voice volume (VoVol) parameter indicative of a volume defined for that voice. The fourth word stores three highest bits of an F number (FNUM(H)) and a 3-bit block parameter (BLOCK). The F number indicates frequency information for one octave of that voice. The block parameter specifies an octave for the sounding interval. The fifth word stores seven lowest bits of the F number (FNUM(L)). The sixth word stores a 1-bit key-on parameter (KeyOn), a 1-bit mute parameter (Mute), a 1-bit reset parameter (RS), and a 4-bit part parameter (#PRT). The key-on parameter indicates the key-on state when set to "1" or the key-off state when set to "0". The mute parameter is used for volume setting and indicates the mute state when set to "1" or the thru-state when set to "0". The reset parameter indicates the reset state of an envelope generator when set to "1" or the normal state when set to "0". The part parameter specifies a part parameter number associated with that voice. The above-mentioned voice parameters are equally defined for the FM and WT voices.

Addresses #144 to #159 of the part parameter area 34b store a 5-bit part volume parameter (Prtvol) for 16 parts. One word is used for each part. The part volume parameter specifies a volume to be set for each part.

Addresses #160 to #175 of the part parameter area 34b store a 5-bit pan pot parameter (Panpot) for 16 parts. One word is used for each part. The pan pot parameter specifies a right-left balance to be set for each part.

Addresses #176 to #191 of the part parameter area 34b store a 3-bit vibrato modulation parameter (XVB) for 16 parts. One word is used for each part. The vibrato modulation parameter indicates a change in the vibrato modulation to be set for each part.

Addresses #192 to #223 of the part parameter area 34b store a pitch bend parameter (BEND) for 16 parts. Two words are used for each part. The pitch bend parameter specifies a multiple of the sounding frequency for each part. The first word stores the 2-bit integer portion (INT) of the multiple and three highest-order bits (FRAC(H)) for the fractional portion thereof. The second word stores six highest-order bits (FRAC(L)) for the fractional portion.

Figure 7:
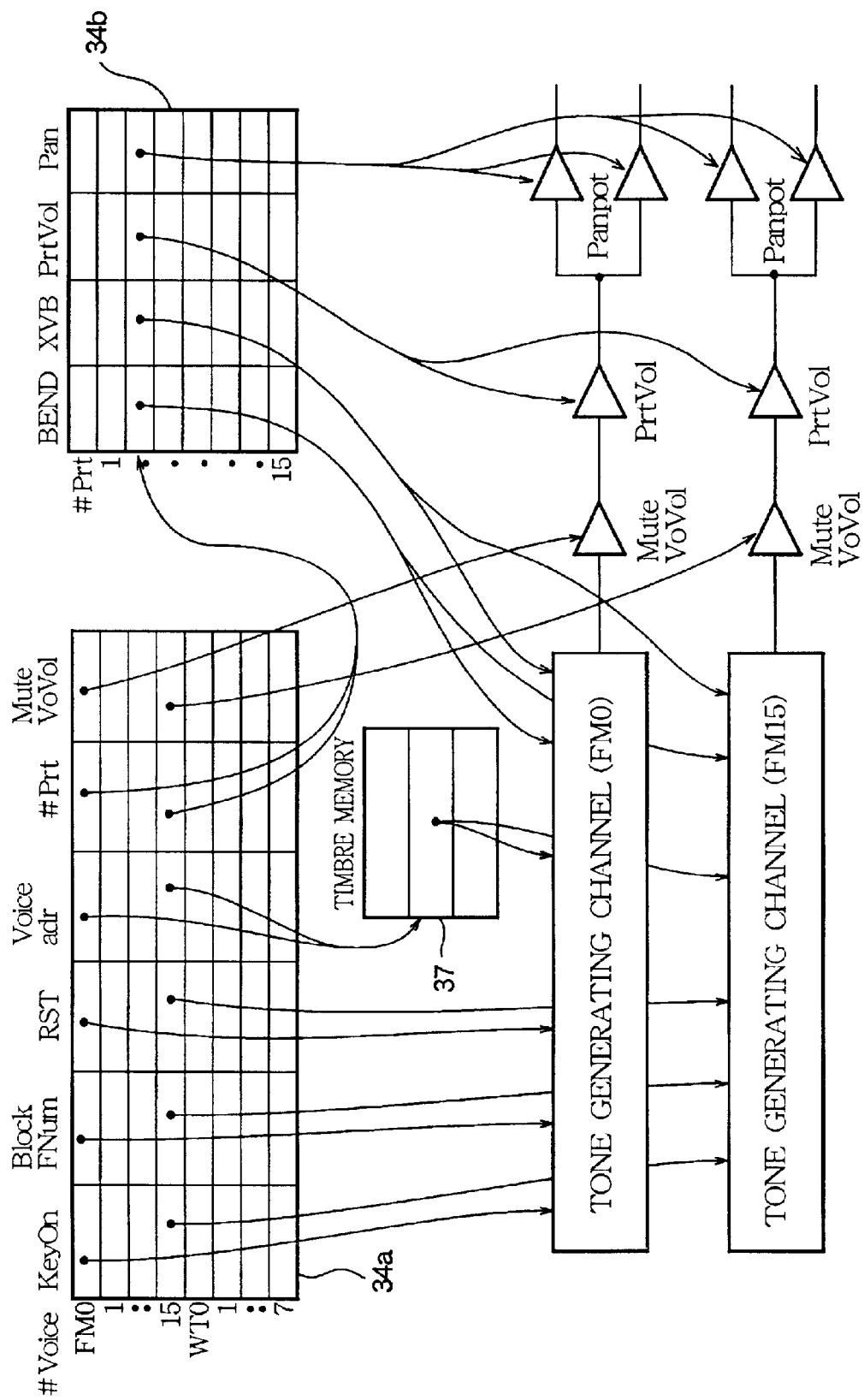
FIG. 7 illustrates how a musical tone is generated in a tone generator block.

With reference to FIG. 7, the following describes how tone generating channels in the FM tone generator 35 or the WT tone generator 36 generate a musical tone by using the tone generator control register 34 (voice parameter area 34a and part parameter area 34b) and the timbre memory 37 in the tone generator block 33.

In FIG. 7, the reference numeral 37 denotes timbre memory comprising either or both of ROM (used for preset timbres) and RAM. The timbre memory 37 stores timbre data for each timbre. The timbre data is specific to each timbre and comprises waveform parameters and other data. The waveform parameters specify a musical tone waveform. For the FM tone generator, the waveform parameters specify an FM operation algorithm. For the WT tone generator, the waveform parameters include a start address, a loop start address and an end address of timbre waveform data. The other data includes an envelope parameter for specifying an attack rate, decay rate, sustain level, release rate, etc., a modulation parameter for specifying the depth or speed of the vibrato or the tremolo, an effect parameter for specifying reverberation, chorus, variation, etc.

Here, it is assumed that a given FM timbre is allocated to part #1 and that generation of the timbre for that part is allocated to two tone generating elements FM0 and FM15 in the FM tone generator.

As shown in FIG. 7, the tone generating channels FM0 and FM15 are supplied with the key-on (Keyon), block (Block), F number (Fnum), and reset (RST) parameters from corresponding storage locations of the voice parameter area 34a in the tone generator control register 34. Further, the tone generating channels are supplied with timbre data read from the timbre memory 37 at the address specified by the voice address (Voice Adr). There are also supplied the pitch bend parameter (BEND) and the vibrato parameter (XVB) for the performance part referenced by the part number (#PRT) parameter in the part parameter area 34b. When KeyOn is set to 1, each tone generating channel generates a musical tone having the timbre corresponding to the timbre data read from the timbre memory 37 and having a pitch specified by the Block and FNum parameters. Both of the tone generating channels FM0 and FM15 are supplied with the same pitch bend (BEND) and vibrato (XVB) parameters, and output musical tones corresponding to the parameters. After each of the tone generating channels FM0 and FM15 outputs the musical tone, the amplifier multiplies that musical tone by coefficients corresponding to the Mute and VoVol parameters stored in the corresponding Mute and VoVol locations of the voice parameter area 34a. The musical tone is further multiplied by the part volume (Prtvol) parameter stored in the part parameter area 34b. This parameter is common to both of the tone generating channels FM0 and FM15. The musical tone is divided into the right and left stereo channels. Each stereo channel is then multiplied by a coefficient corresponding to the pan (Pan) parameter stored in the part parameter area.

As mentioned above, the tone generator apparatus according to the present invention provides the tone generator control register 34 with the voice parameter area 34a and the part parameter area 34b separately. The voice parameter area 34a stores a part number to which the voice belongs. The part number is used to reference the part parameter area 34b. The part parameter area 34b supplies a common parameter to each voice (tone generating channel) belonging to a given part. Accordingly, the CPU 10 need not create tone generator hardware control data for each voice with respect to the parameters common to the part. It is possible to decrease the amount of data to be written to the tone generator control register 34.

The following describes how the tone generator hardware control data conversion means 10b creates tone generator hardware control data from song sequence data such as SMF data and SMAF data.

Referring now to FIGS. 8(a) and 8(B), the timbre table and the voice assign table will be described. The timbre table stores the correspondence between each part and timbre to be used for generating musical tones based on the DVA system. The voice assign table manages the usage of the tone generating channels (voices) in the tone generator block.

FIG. 8(a) shows the configuration of the timbre table 11c. This timbre table is provided in the RAM 11 during musical tone reproduction. The timbre table stores the storage address (Voice Adr) in the timbre memory 37 for the timbre number and the timbre data corresponding to each part. Here, it is assumed that the FM or WT timbre is predetermined corresponding to the timbre number. The program change event rewrites the timbre table.

FIG. 8(b) shows the configuration of the voice assign table 11d. This voice assign table is also provided in the RAM 11 during musical tone reproduction. As shown in the figure, the voice assign table 11d stores the following data for each voice (tone generating channel), i.e., information indicating whether the voice is being sounded (key-on state), a key code (pitch) during the key-on state, a part number for the assigned voice and a parameter for some truncation (e.g., an elapsed time from the key-on/off state), etc. When a key-on event occurs, the voice assign table 11d is referenced to assign an unused free channel.

Figure 9:
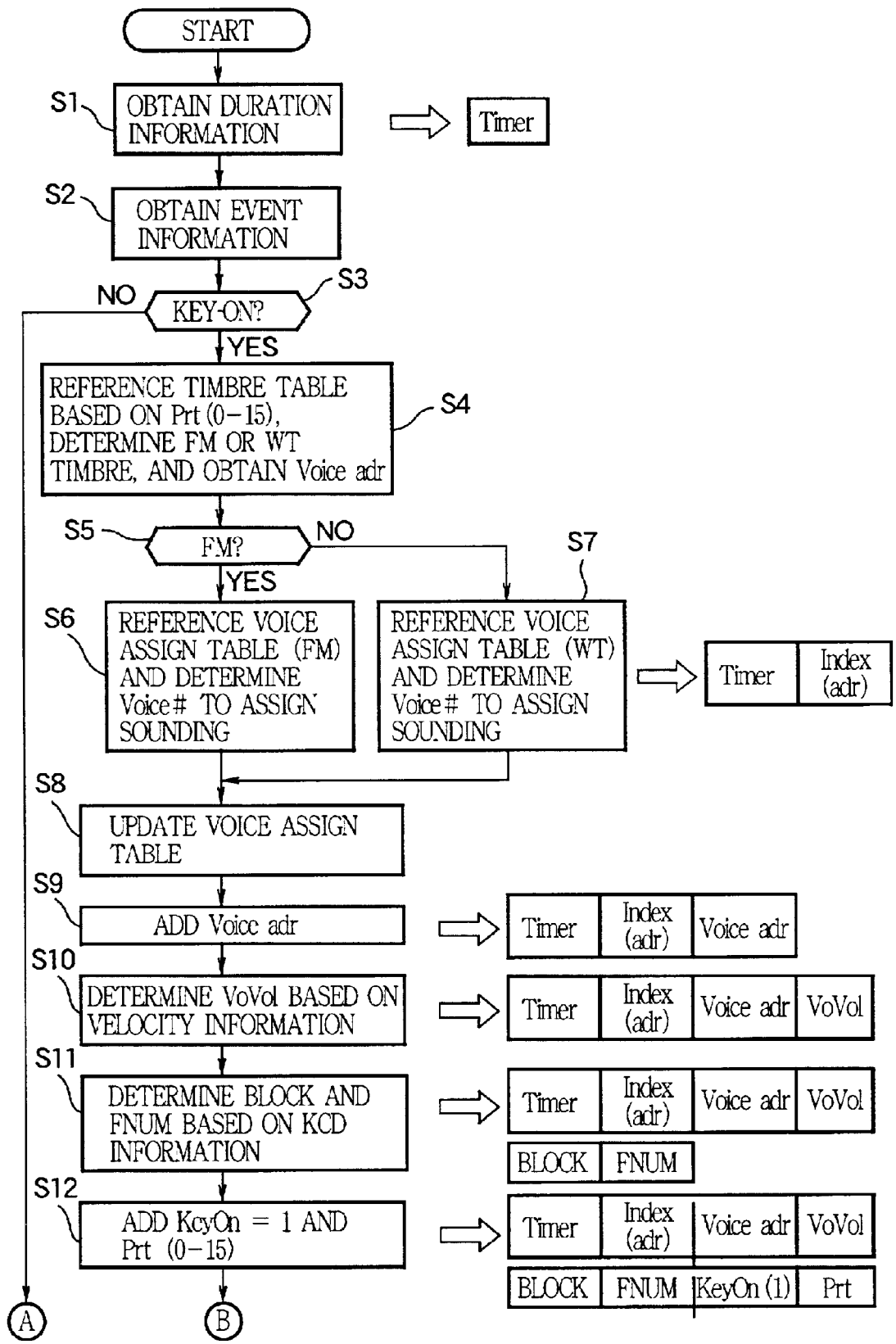
FIG. 9 describes an operation processing flow of tone generator hardware control data conversion.
Figure 10:
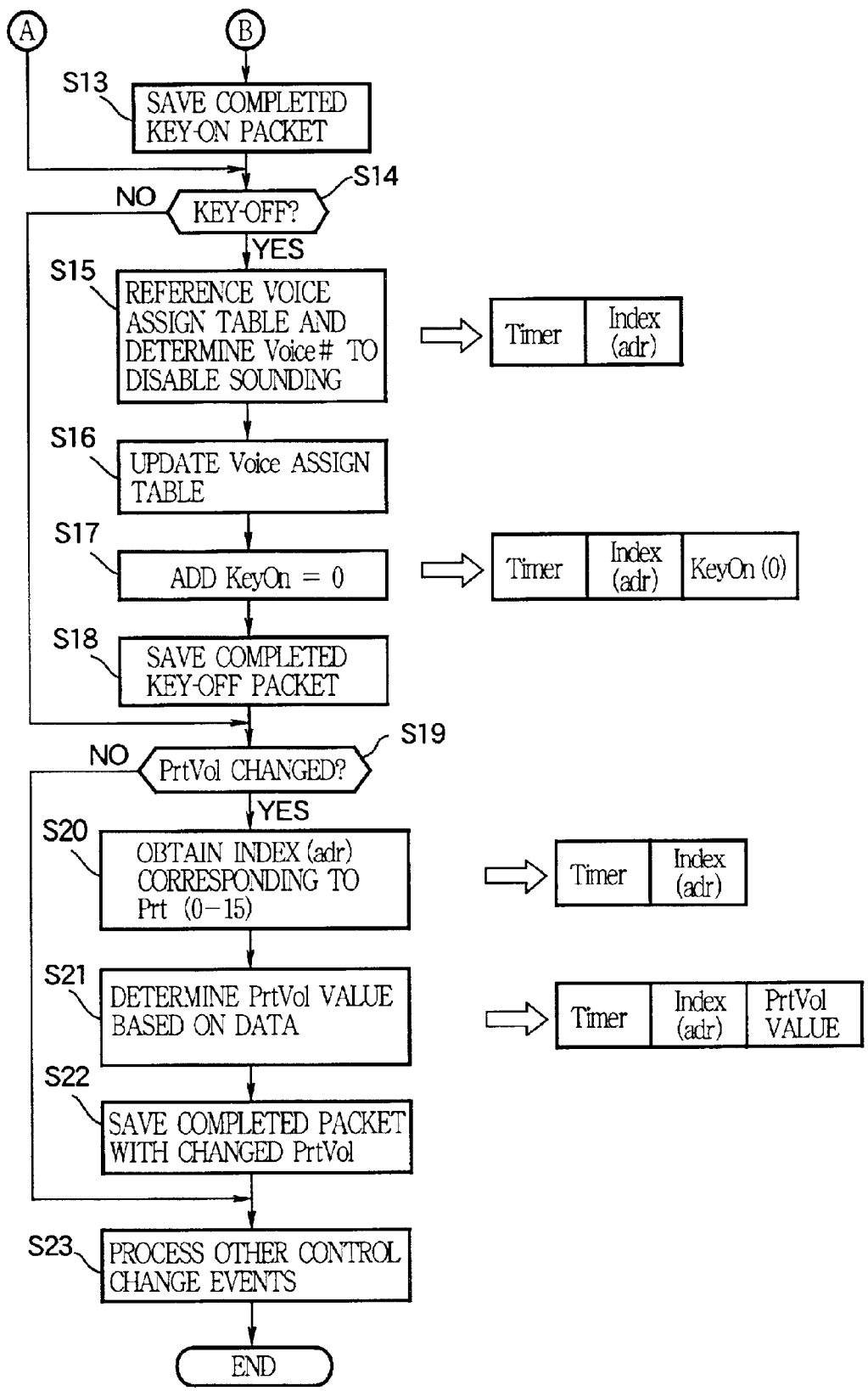
FIG. 10 describes an operation processing flow of tone generator hardware control data conversion following FIG. 9.
Figure 11:
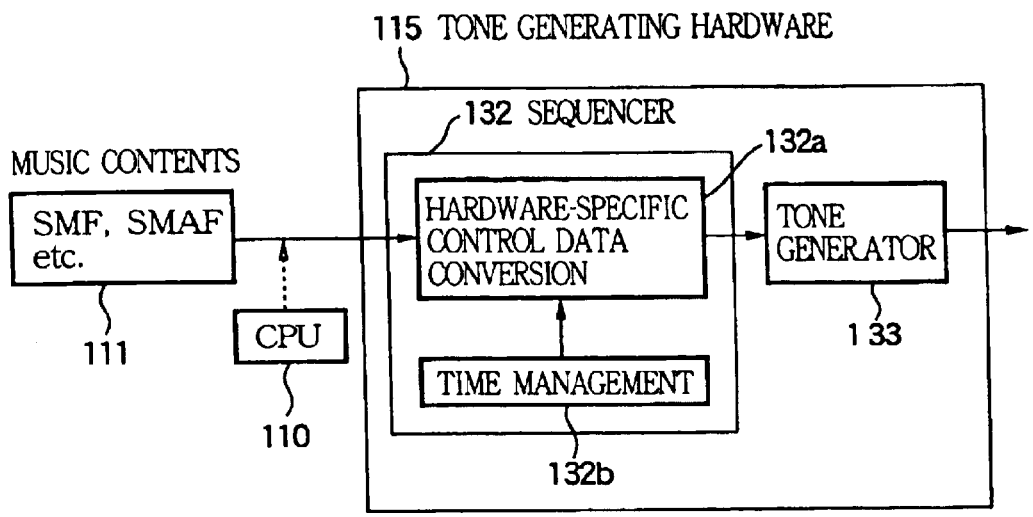
FIG. 11 shows a configuration of a conventional hardware musical sound apparatus.

With reference to FIGS. 9 and 10, the following describes an operation processing flow of the tone generator hardware control data conversion means 10b in the CPU 10. The processing to be described below generates one tone generator hardware control data packet from a set of duration information and event information included in a song file. By repeating the processing for all sets of duration information and event information in the song data file, it is possible to obtain tone generator hardware control data corresponding to that song data file.

First at S1, duration information is read from the song file. Based on this information, the process generates time management information for the tone generator hardware control data.

Then, event information is obtained (S2). It is determined whether or not the event information is a key-on event (S3). When a key-on event is detected, the timbre table 11c is referenced based on the part number (prt#) included in the key-on event. It is determined whether the timbre allocated to the part is an FM timbre using the FM tone generator 35 or a WT timbre generated from the WT tone generator 36. Further, the voice address (Voice adr) is obtained (S4).

The voice assign table 11d is referenced to detect an unused voice (whose key-on area contains 0) for the identified timbre and to determine a number of the voice (tone generating channel) for allocating tone generation (S5 and S6 or S7). At this point, the index information (Index) is determined based on the determined voice number. As shown in the figure, the index information is added to the time management information.

At step S8, the process updates the areas for the voice determined in the voice assign table 11d. Namely, the process writes 1 to the key-on block, the key code to the key code block (KCD), and the part number to the part number block (prt) for the entry corresponding to that voice in the voice assign table 11d.

Thus, it is possible to add the voice address (Voice adr) of the voice obtained at step S4 to the time management information (Timer) and the index (Index) (S9).

Then, the process determines the voice volume (VoVol) based on the velocity information included in the key-on event (S10). The process determines the block information (Block) and the F number (FNum) based on the key code information (KCD) (S11), and adds these pieces of information to the packet. The process adds KeyOn=1 and the part number (prt) (S12), completes the key-on packet, and saves that packet in the tone generator hardware control data storage area 11b of the RAM 11.

When the obtained event information indicates a key-off event (YES at S14), the process references the voice assign table 11d at step S15 to determine a voice number for disabling the tone generation. This means detecting a voice responsible for sounding of the part included in the key-off event. Thus, the voice's index can be added to the time management information. The voice assign table 11d is updated at S16 (setting KeyOn=0 for that voice). The process then adds KeyOn=0 to the packet (S17) and saves the completed key-off packet (S18).

When the obtained event information indicates a part volume change event (YES at S19), the process obtains index information corresponding to the part number included in that event (S20). The index indicates an address (one of #144 through #159 in FIG. 7) for the part number in the area corresponding to the part volume in the part parameter area 34b. In this manner, the index information (Index) can be added to the packet.

The process determines a part volume value (Prtvol) based on the data value included in the part volume change event. The process adds that value to the packet (S21) and saves the completed packet in the RAM 11 as mentioned above.

Control change events such as a pan-pot change event, a vibrato change event, and a pitch change event have an effect on all voices belonging to the same part. For these control change events, it is also possible to generate a packet indexed by an address in the part parameter area 34b (S23). Just the timbre table 11c needs to be updated for the control change events.

According to the above-mentioned process, it is possible to generate a packet for one set of duration information and event information. If the process is performed for all sets of duration information and event information, it is possible to complete the hardware control data of the object song.

In the above description, the tone generator hardware control data conversion means 10b creates one packet comprising time management information, index information, and control data from a set of duration information and event information. The present invention is not limited thereto. It may be preferable to create a packet corresponding to a plurality of sets of duration information and event information. Namely, one packet may contain a plurality of pieces of time management information, index information, and control data. In this case, the packet may be prefixed with a header that indicates the number of pieces of data contained in the packet or the packet length.

The tone generator apparatus and the musical sound apparatus according to the present invention can be applied not only to the portable telephone set, but also to portable information devices, portable personal computers, etc. capable of generating musical tones.

According to the present invention as mentioned above, the tone generator block 33 includes the tone generator control register 34 which stores tone generation control parameters for the tone generating channels. The tone generator control register 34 is provided with the voice parameter area 34a and the part parameter area 34b separately. The voice parameter area 34a stores control parameters for each tone generating channel. The part parameter area 34b stores control parameters for each part. Each tone generating element is configured to generate a musical tone according to the control parameters stored in both of the areas 34a and 34b. For this reason, while control change events have an effect on all voices belonging to the same part, the tone generator block can be supplied with the control change events as control parameters common to a plurality of channels belonging to one part. In such a case, the control change events need not be individually converted to control parameters (tone generator hardware control data) for each tone generating element. Accordingly, processing loads can be decreased.

Since the software is used for the conversion processing, it is possible to easily provide compatibility with song sequence data having a new format.

Moreover, the sequencer 32 in the tone generator hardware 15 just needs to be responsible for time management, thereby decreasing the amount of hardware needed.

What is claimed is:

1. A music apparatus for generating music tones of a plurality of performance parts constituting a music piece based on sequence data representative of the music piece, the music apparatus comprising:

a tone generator that has a plurality of tone generating elements for generating therethrough the music tones;

an assigning section that assigns the plurality of the tone generating elements to the plurality of the performance parts such that each performance part may involve one or more of tone generating elements;

a sequencer that processes the sequence data to sequentially provide parameters for use in the tone generating elements, the parameters including individual parameters used individually in each of the tone generating elements and a common parameter used commonly in two or more tone generating elements which are assigned to one performance part by the assigning section, each individual parameter including identification information identifying the performance part corresponding to the individual parameter; and a register that is divided into a first area for storing the individual parameters provided from the sequencer and a second area for storing the common parameter provided from the sequencer, wherein each of the tone generating elements acquires the individual parameter from the first area of the register, and acquires from the second area of the register the common parameter corresponding to the performance part which is identified by the identification information contained in the acquired individual parameter, such that each tone generating element can use both of the acquired individual parameter and the acquired common parameter for generating the music tone characterized by both of the individual and common parameters.

2. A portable terminal set which can be carried by a user, comprising:

a communication block that is operable by the user for receiving and sending information;

a music sound block that is provided for generating a plurality of music tones arranged in a set of performance parts of a music piece from a plurality of tone generating elements based on sequence data representative of the music piece in association with operation of the communication block, the music sound block including a tone generator that has the plurality of tone generating elements for generating therethrough the music tones, each tone generating element being assigned with one performance part among a plurality of performance parts constituting a music piece, at least two of the plurality of the tone generating elements generating tones simultaneously;

an assigning section that assigns the plurality of tone generating elements to the set of the performance parts such that each performance part may involve one or more of the tone generating elements;

a sequencer that processes the sequence data to sequentially provide parameters for use in the tone generating elements, the parameters including individual parameters used individually in each of the tone generating elements and a common parameter used commonly in two or more tone generating elements which are assigned to one performance part by the assigning section, each parameter including identification information identifying the performance part corresponding to the individual parameter; and a register that is divided into a first area for storing the first parameters provided from the sequencer and a second area for storing the second parameter provided from the sequencer, wherein each tone generating element acquires the individual parameter from the first area of the register, and acquires from the second area of the register the common parameter corresponding to the performance part which is identified by the identification information contained in the acquired individual parameter, such that each tone generating element can use both of the acquired individual parameter and the acquired common parameter set to the corresponding tone generating element and characterized by both of the individual and common parameters.

3. The tone generator apparatus according to claim 1, wherein at least two of the tone generating elements using the same common parameter generate tones having a specific timbre which is common to said at least two of the tone generating elements.

4. The tone generator apparatus according to claim 1, wherein the common parameter is associated to at least one of a volume change event, a pan-pot change event, a vibrato change event or a pitch bend change event.

5. A music apparatus for generating music tones of a plurality of performance parts constituting a music piece based on sequence data representative of the music piece, the music apparatus comprising:

a tone generator that has a plurality of tone generating elements for generating therethrough the music tones;

an assigning section that assigns the plurality of the tone generating elements to the plurality of the performance parts such that each performance part may involve one or more of tone generating elements;

a sequencer that processes the sequence data to sequentially provide parameters for use in the tone generating elements, the parameters including individual parameters used individually in each of the tone generating elements and a common parameter used commonly in two or more tone generating elements which are assigned to one performance part by the assigning section, each individual parameter including identification information identifying the performance part corresponding to the individual parameter; and a register that is divided into a first area for storing the individual parameters provided from the sequencer and a second area for storing the common parameter provided from the sequencer, wherein each of the tone generating elements acquires the individual parameter from the first area of the register, and acquires from the second area of the register the common parameter corresponding to the performance part which is identified by the identification information contained in the acquired individual parameter, such that each tone generating element can use both of the acquired individual parameter and the acquired common parameter for generating the music tone characterized by both of the individual and common parameters, and wherein the at least one of said tone generating elements is supplied with the acquired common parameter from the second area in the register to generate the music tone specific to said one tone generating element, the acquired common parameter being at least one of a pitch bend parameter or a vibrato parameter.

6. A portable terminal set which can be carried by a user, comprising:

a communication block that is operable by the user for receiving and sending information;

a music sound block that is provided for generating a plurality of music tones arranged in a set of performance parts of a music piece from a plurality of tone generating elements based on sequence data representative of the music piece in association with operation of the communication block, the music sound block including a tone generator that has the plurality of tone generating elements for generating therethrough the music tones, each tone generating element being assigned with one performance part among a plurality of performance parts constituting a music piece, at least two of the plurality of the tone generating elements generating tones simultaneously;

an assigning section that assigns the plurality of tone generating elements to the set of the performance parts such that each performance part may involve one or more of the tone generating elements;

a sequencer that processes the sequence data to sequentially provide parameters for use in the tone generating elements, the parameters including individual parameters used individually in each of the tone generating elements and a common parameter used commonly in two or more tone generating elements which are assigned to one performance part by the assigning section, each parameter including identification information identifying the performance part corresponding to the individual parameter; and a register that is divided into a first area for storing the first parameters provided from the sequencer and a second area for storing the second parameter provided from the sequencer, wherein each tone generating element acquires the individual parameter from the first area of the register, and acquires from the second area of the register the common parameter corresponding to the performance part which is identified by the identification information contained in the acquired individual parameter, such that each tone generating element can use both of the acquired individual parameter and the acquired common parameter set to the corresponding tone generating element and characterized by both of the individual and common parameters, and wherein the corresponding tone generating element is supplied with the acquired common parameter from the second area in the register to generate a tone specific to the corresponding tone generating element, the acquired common parameter being at least one of a pitch bend parameter or a vibrato parameter.

7. The tone generator apparatus according to claim 5, wherein at least two of the tone generating elements using the same common parameter generate tones having a specific timbre which is common to said at least two of the tone generating elements.

8. The tone generator apparatus according to claim 5, wherein the common parameter is associated to at least one of a volume change event, a pan-pot change event, a vibrato change event or a pitch bend change event.

9. The tone generator apparatus according to claim 2, wherein at least two of the tone generating elements using the same common parameter generate tones having a specific timbre which is common to said at least two of the tone generating elements.

10. The tone generator apparatus according to claim 2, wherein the common parameter is associated to at least one of a volume change event, a pan-pot change event, a vibrato change event or a pitch bend change event.

11. The tone generator apparatus according to claim 6, wherein at least two of the tone generating elements using the same common parameter generate tones having a specific timbre which is common to said at least two of the tone generating elements.

12. The tone generator apparatus according to claim 6, wherein the common parameter is associated to at least one of a volume change event, a pan-pot change event, a vibrato change event or a pitch bend change event.

* * * * *